US008787209B2

(12) United States Patent
Halsall

(10) Patent No.: US 8,787,209 B2
(45) Date of Patent: Jul. 22, 2014

(54) INTERFACE MODULE AND CONTROLLER NETWORK

(75) Inventor: Brian Halsall, Bristol (GB)

(73) Assignee: Oxford Instruments Nanotechnology Tools Limited, Abingdon Oxon (GB)

(*) Notice: Subject to any disclaimer, the term of this patent is extended or adjusted under 35 U.S.C. 154(b) by 304 days.

(21) Appl. No.: 13/254,404

(22) PCT Filed: Mar. 3, 2010

(86) PCT No.: PCT/GB2010/000389
§ 371 (c)(1),
(2), (4) Date: Oct. 4, 2011

(87) PCT Pub. No.: WO2010/100426
PCT Pub. Date: Sep. 10, 2010

(65) Prior Publication Data
US 2012/0039217 A1 Feb. 16, 2012

(30) Foreign Application Priority Data
Mar. 5, 2009 (GB) .................................. 0903836.5

(51) Int. Cl.
H04L 12/28 (2006.01)
H04L 29/06 (2006.01)

(52) U.S. Cl.
CPC ........... *H04L 29/06068* (2013.01); *H04L 69/08* (2013.01)
USPC .......................................... 370/255; 709/246

(58) Field of Classification Search
USPC .......................................... 709/246; 370/255
See application file for complete search history.

(56) References Cited

U.S. PATENT DOCUMENTS

| 5,225,974 A | 7/1993 | Mathews et al. |
| 6,192,281 B1 | 2/2001 | Brown et al. |

(Continued)

FOREIGN PATENT DOCUMENTS

| DE | 4417423 A1 | 10/1995 |
| GB | 2403043 A | 12/2004 |
| GB | 2406043 A | 3/2005 |

OTHER PUBLICATIONS

British Search Reports dated May 22, 2009 and Jun. 30, 2009 issued in GB 0903836,5 (2 pages).

*Primary Examiner* — Kenny Lin
(74) *Attorney, Agent, or Firm* — Blank Rome LLP

(57) ABSTRACT

An interface module is provided for connecting a device to a controller within a controller network. The controller is adapted to supply and/or receive data according to a network protocol, and the device is adapted to supply and/or receive data according to a device protocol. The interface module comprises: a network connector supporting a plurality of network channels for connecting the interface module to the controller via the controller network; a device connector supporting a plurality of device channels for connecting the interface module to the device; a conversion unit arranged to receive the plurality of network channels from the network connector, and adapted to convert data between the network protocol and the device protocol, the conversion unit having one or more signal terminals for supplying and/or receiving signals to or from the device; and a configuration unit between the conversion unit and the device connector, adapted to configure the interface module to the device by routing selected device channels to selected signal terminals of the conversion unit. The configuration unit is separable from and removably coupled to the conversion unit such that the interface module may be configured for use with a different device by replacement of the configuration unit. Also provided is a controller network comprising one or more devices and a controller for control of the devices, each of the devices being connected to the controller via an interface module.

29 Claims, 6 Drawing Sheets

(56) References Cited

U.S. PATENT DOCUMENTS

| | | |
|---|---|---|
| 6,473,656 B1 | 10/2002 | Langels et al. |
| 7,216,191 B2 | 5/2007 | Sagues et al. |
| 2005/0198406 A1 | 9/2005 | Sichner |
| 2006/0031586 A1* | 2/2006 | Sethi et al. ............ 709/246 |
| 2007/0223382 A1 | 9/2007 | Crabtree et al. |
| 2007/0228826 A1 | 10/2007 | Jordan et al. |
| 2007/0255879 A1 | 11/2007 | Sagues et al. |
| 2008/0114902 A1 | 5/2008 | Leong et al. |

* cited by examiner

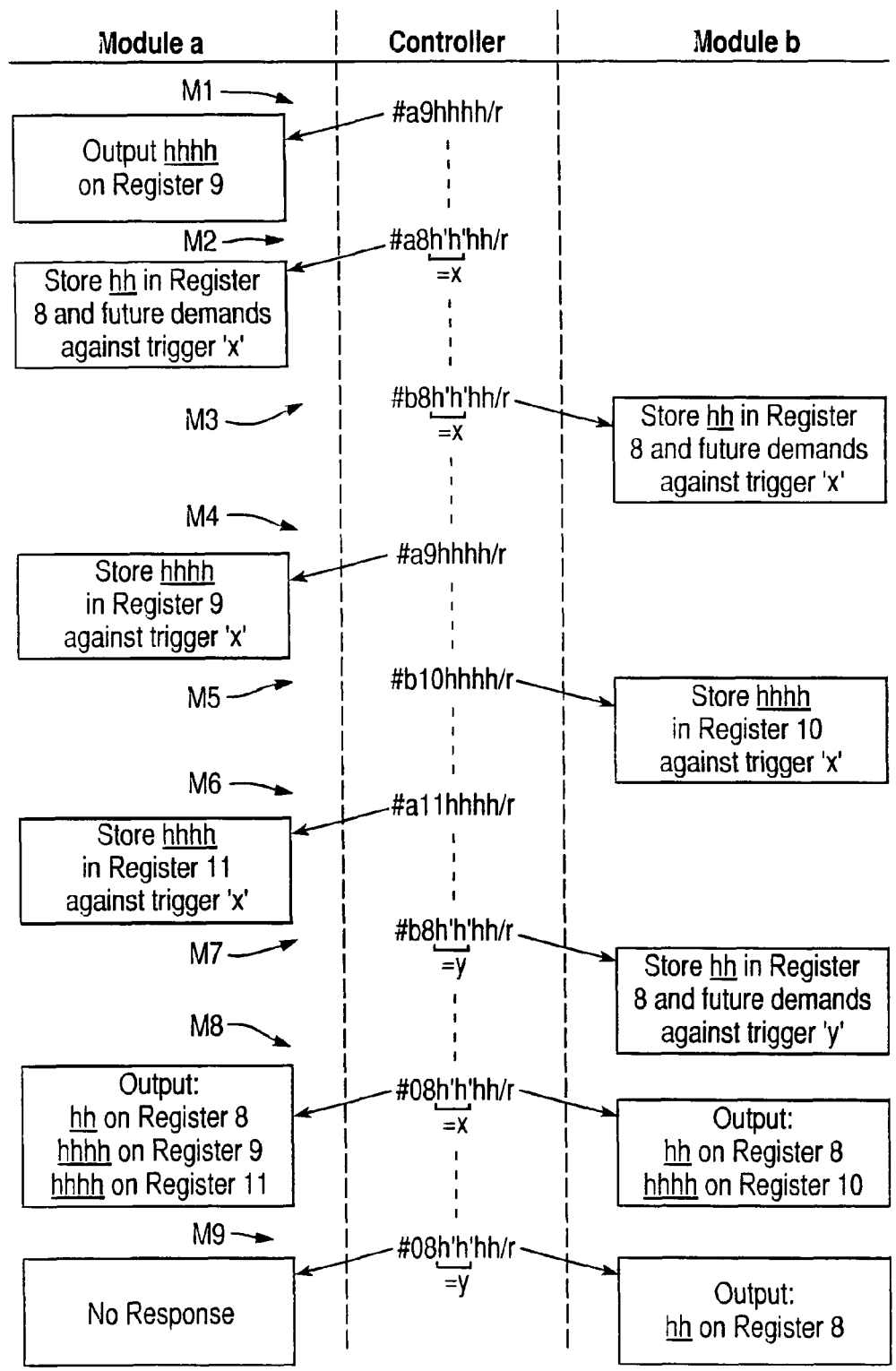

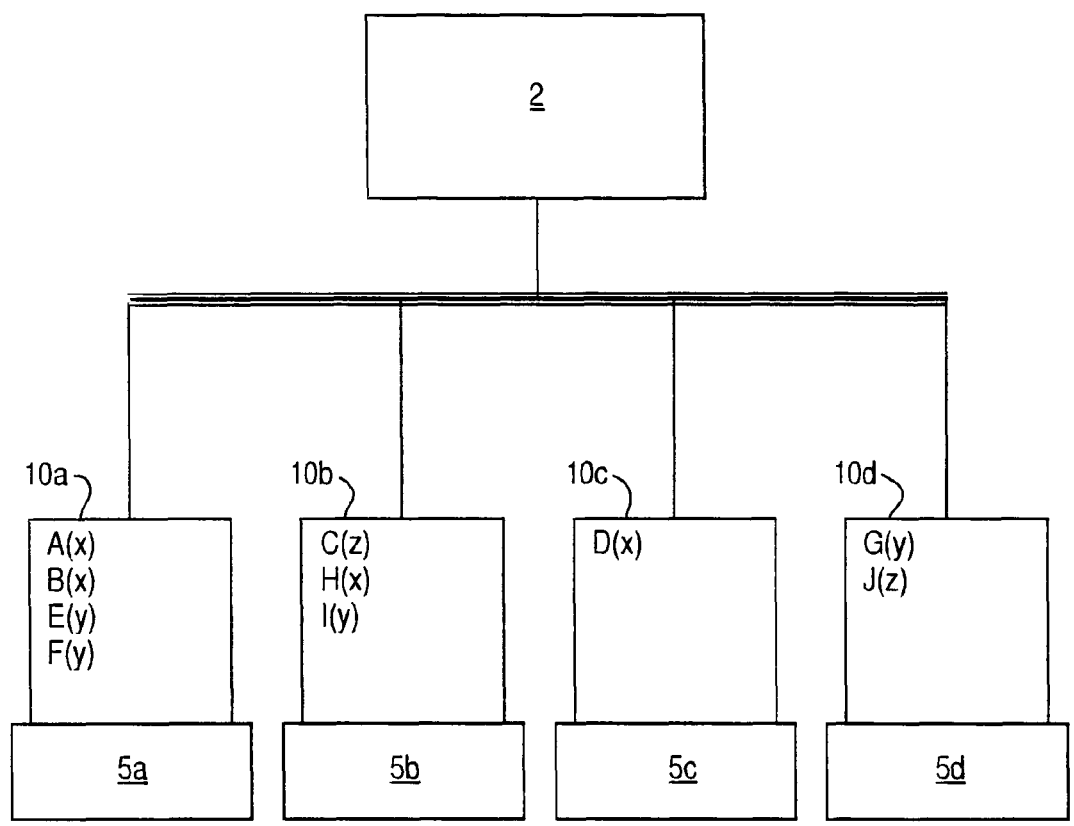

INTERFACE MODULE AND CONTROLLER NETWORK

REFERENCE TO RELATED APPLICATION

The present application is a National Stage of International Patent Application No. PCT/GB2010/1000389, filed Mar. 3, 2010, published on Sep. 10, 2010, as WO 2010/100426, which claims the benefit of GB 0903836.5 filed Mar. 5, 2009, whose disclosures are hereby incorporated by reference in their entireties into the present disclosure.

The present invention relates to controller networks and, in particular, interface modules for connecting a device to a controller via a controller network.

Many systems now make use of a network to manage a number of electrically-controlled devices from a central controller. Such devices are often called 'OEM' (original equipment manufacturer) devices, which require at least one or more electrical control (data) signals as well as electrical power, and may also provide electrical output (data) signals on their status. An example would be a 'mass flow controller' for controlling a gas flow, with electrical connections typically including: one analogue input (the 'set point'); one analogue output (proportional to the actual gas flow); DC power supplies; and one or more digital (on or off) controls to set the device fully open or fully closed. OEM devices sometimes provide serial interfaces, signalling by strings of high and low states to an agreed protocol. Typically, such devices comprise embedded microcontrollers for local control of their functions. In the following, all such devices are referred to as 'OEM devices', even if these are bespoke designs, not bought from an original equipment supplier.

Examples of apparatus which may make use of such systems include industrial machines, manufacturing plants and processes, vehicles and specialised equipment such as laboratory tools and thin film deposition chambers.

One problem to solve is designing a tool using several different OEM units, each with its own electrical interface. This usually requires a custom electrical design to provide the required connections to each OEM device. Serial communications can reduce the number of physical wires, but power must still be supplied in addition. There is also the problem that there are many different serial signalling protocols, and it may be necessary to combine OEM devices with more than one protocol on the same system.

Systems that require the synchronous control of many OEM or bespoke devices have conventionally been achieved through connecting all OEM devices to a central hub where commands are given and data read back. Such systems have often been constructed in a manner that is rigid and inflexible to change or possible adaptation. The hard-wiring of many OEM or bespoke devices distributed over some area or across a machine to a central PLC (Programmable Logic Controller) is an example of such a system.

Where multiple devices that require connection to a PLC exist in a system that has complex wiring and/or looms that are not trivial to separate, the addition or removal of such a device is understandably difficult and in most cases a time consuming enterprise. Repositioning of such a device in the system is also difficult and suffers from similar drawbacks.

The time expended building such systems is also a non-trivial and demanding process with many opportunities for wiring errors that cannot be detected until power is applied to the system on a final check. Any wiring errors that are found are not simple to fix and may require the system to be partially disassembled and/or wiring looms to be split apart.

When complex systems are constructed with many OEM or bespoke devices the wiring time can be considerable. Each OEM or bespoke device will require the correct plug or socket to be formed with the correct cable of the correct length which can vary depending on the type of machine the device is installed on. If a system is controlled via a PLC then further wiring time is expected and further wiring errors are likely.

U.S. Pat. No. 5,225,974 discloses a programmable controller module which comprises a primary processor and a series of input/output modules for exchanging data with remote devices. However this does not solve the aforementioned problems since the various remote devices must still be wired carefully to their respective input/output module, which together form a unit not dissimilar to the conventional PLC. The disclosure also does not address the need to provide each device with different format inputs and outputs, such as analogue, digital and serial.

US-A-20050198406 discloses a self-determining I/O module which automatically configures the module to function as a block I/O device, a network adaptor or an I/O module by determining its arrangement selected within the network. However, its interface with the devices themselves remains conventional, each module being designed uniquely for its respective device.

US-A-20070255879 discloses a programmable input/output module arranged between the one or more devices and the controller. The I/O module is provided with multiple device communication connectors, each having a number of pins for interconnection via a cable to a device. The I/O module provides a controlled interface with each pin such that interconnections can be changed by programming the interfaces to provide the correct connectivity with the devices. This in itself is an expensive and time consuming exercise and the module must inherently include a very high level of redundant components, thereby increasing the cost of the system. Further it remains essential to wire each of the devices to the I/O module correctly, in accordance with its programming.

Similarly, US-A-20070223382 discloses a connector module that has pin configurations stored in a local memory which can be used to configure the adapter, and US-A-20080114902 describes an I/O control system in which the all possible pin configurations are programmed into the module before installation and the user can select the appropriate device from a list. Again, both are complex and expensive approaches.

In accordance with the present invention, an interface module is provided for connecting a device to a controller within a controller network, the controller being adapted to supply and/or receive data according to a network protocol, and the device being adapted to supply and/or receive data according to a device protocol, the interface module comprising:

a network connector supporting a plurality of network channels for connecting the interface module to the controller via the controller network;

a device connector supporting a plurality of device channels for connecting the interface module to the device;

a conversion unit arranged to receive the plurality of network channels from the network connector, and adapted to convert data between the network protocol and the device protocol, the conversion unit having one or more signal terminals for supplying and/or receiving signals to or from the device; and a configuration unit between the conversion unit and the device connector, adapted to configure the interface module to the device by routing selected device channels to selected signal terminals of the conversion unit;

wherein the configuration unit is separable from and removably coupled to the conversion unit such that the interface module may be configured for use with a different device by replacement of the configuration unit.

The interface module preferably connects a single device to the controller (i.e. exactly one device), and may be provided as an add-on to that device (rather than to the controller or some other location in the network). If the tool or other system incorporating the network requires more than one device to be controlled by the network, each respective device is provided with its own interface module for connection to the controller.

By making it possible to separate the configuration unit from the rest of the interface module, a generic conversion unit can be supplied for processing the data received over the network into a format suitable for the device (and vice versa). In other words, the same conversion unit can support several different device protocols simultaneously. For example, the conversion unit could be adapted to convert serial network data into a number of analogue and/or digital inputs for transmission to the device, which may be suitable for use by a number of different end devices. The design of the conversion unit need not take into account which of those inputs are in fact to be used by the device, nor how to connect them to the correct device channels. This is achieved by the removable configuration unit, which connects the appropriate inputs to the desired device channels. Hence it is only the configuration unit which is device-specific and since this typically comprises only routing means (e.g. an appropriate arrangement of tracks), this is an inexpensive component.

As a result, the overall part count is kept small whilst not requiring the use of complex and expensive re-programmable interfaces.

The configuration unit could be integral with the device connector such that both are replaced when configuring the module for a different device, but preferably the configuration unit is also removably coupled to the device connector to minimise work involved in reconfiguring the module and to keep the cost of the replaceable component low.

Depending on the nature of the system and the specific devices involved, there may only be need for data to be input to the devices, and no output data returned. However, in many systems data will be output by the devices and returned to the controller, such as device status data. Hence, preferably, the plurality of network channels includes at least one data input channel for supplying data to the device, and at least one data output channel for receiving data from the device. Similarly, it is preferable that the plurality of device channels includes at least one data input channel for supplying data to the device, and at least one data output channel for receiving data from the device.

As indicated above, the primary function of the conversion unit is to convert data between the network protocol and the device protocol. It should be noted that here the term "protocol" encompasses both serial data protocols and other data formats, such as digital (binary) format and analogue format. In many cases this may be the sole function of the unit. However, preferably, the conversion unit comprises a processor adapted to convert data between the network protocol and the device protocol, and an input/output section adapted to adjust signal levels between a processor signal level range and a device signal level range. This is advantageous since network signal levels and device signal levels are typically set at different orders of magnitude. The input/output section therefore performs any necessary amplification and protects the processor and/or the device from excessive signal levels.

Preferably, the conversion unit is further adapted to detect faults in the connection between the interface module and the device. This additional functionality assists the user in fast diagnosis of any network connection problems. Advantageously, the input/output section incorporates a fault detection circuit for the detection of open circuits and short circuits, and/or a load impedance circuit for determining the approximate impedance of a load.

In a particularly preferred embodiment, the module further comprises an indication means for indicating status information to a user, preferably a light source or an optical display, the conversion unit being further adapted for control of the indication means. This enables the user to locate faults in the network quickly. Preferably the conversion unit is adapted to actuate the indication means to indicate the detection of faults in the connection between the interface module and the device.

In preferred examples, the network protocol is a serial data protocol and hence, preferably, the conversion unit further comprises a serial data interface for communicating with the controller via the control network.

The interface module could be permanently programmed with a network address but preferably, the module further comprises an address switch section for programming the interface module with a network address, the address switch section preferably being comprised in the conversion unit. In other examples, the network address could be provided on the configuration unit such that it is automatically set when the module is configured to the specific device.

Advantageously, the configuration unit comprises a first connector matched to the device channels and a second connector matched to the signal terminals of the conversion unit, and tracks therebetween for connecting the selected device channels to the selected signal terminals. As indicated above, it is preferable that the configuration unit comprises the minimum number of components such that cost is kept low, but in certain cases it may be desirable for the configuration unit to perform some additional processing. Hence, in preferred examples, the configuration unit further comprises scaling means for adjusting the level of a signal between the device channels and signal terminals.

The conversion unit could be configured so that it can convert data from the network protocol/format into all of the formats required by the various devices in the network simultaneously, i.e. providing a number of different analogue, digital and serial inputs and outputs at its signal terminals. The appropriate inputs and outputs would then be selected for each device by use of the device-specific configuration unit. However, depending on the system this could lead to an unduly complex and expensive unit. It is therefore preferable to arrange for the conversion unit to provide data inputs and outputs which are in a combination of formats which will meet the requirements of a subset of the devices (the subset preferably including more than one device). For example, one conversion unit may be adapted for use with devices requiring analogue inputs and outputs, another for use with devices requiring digital inputs and outputs, and a third for use with devices requiring serial inputs and outputs. However, any of these could still include a mixture of different input/output types. The three different types of interface module equipped with these units may be provided as a set.

In a first preferred example, the conversion unit is adapted such that at least one signal terminal supplies analogue input data to the device, and at least one signal terminal receives analogue output data from the device. Advantageously, more than one analogue input and analogue output is provided. Where the network protocol is a serial data protocol, the conversion unit is therefore preferably adapted to convert data between the serial data protocol and analogue format.

In another preferred example, the conversion unit is adapted such that at least one signal terminal supplies digital input data to the device, and at least one signal terminal receives digital output data from the device. Advantageously, more than one digital input and digital output is provided. Where the network protocol is a serial data protocol, the conversion unit is therefore preferably adapted to convert data between the serial data protocol and digital format. This may be either in addition or as an alterative to the analogue input/outputs described above.

In still another preferred example, the conversion unit is adapted such that at least one signal terminal supplies serial input data to the device, and at least one signal terminal receives serial output data from the device. Advantageously, more than one serial input and serial output is provided. Where the network protocol is a serial data protocol, the conversion unit is therefore preferably adapted to convert data between the serial data protocol of the network and the serial data protocol of the device. Preferably the conversion unit comprises a memory in which parameters of the serial data protocol of the device are stored. This may be either in addition or as an alternative to the analogue input/outputs and/or digital input/outputs described above.

In other examples, the conversion unit could perform additional signal processing. For instance, where the device comprises a sensor, the conversion unit preferably comprises a sensing circuit adapted to generate a signal corresponding to a parameter measured by the sensor. Thus the interface module can output a measurement directly to the network, rather than requiring the controller to carry out the necessary processing. The sensing circuit may be adapted to output the generated signal to the controller or to a local controller comprised in the device. This latter option is particularly advantageous since the measurement result can be used by the local controller immediately and without using up network bandwidth. Such a "sensor" interface module may be provided as a fourth component of the aforementioned set of modules.

In particularly preferred embodiments, power is supplied to the devices through the same controller network. Hence, preferably, the plurality of network channels includes at least one power channel for supplying power to the device from at least one power source; one or more of the signal terminals of the conversion unit are adapted to supply power to the device; and the plurality of device channels includes at least one power channel for supplying power to the device. Such an arrangement allows for a single connection to be made to each device, thereby reducing the wiring requirements still further.

It should be noted that power and data can be supplied over one and the same channel. For example, a digital input channel typically also supplies the device with the power it requires. Hence any one signal terminal could act as both a "data" terminal and a "power" terminal simultaneously.

In some systems, all devices may be suited to the same power supply requirements. However, in many cases, the various devices may require different power inputs. Hence, preferably, a plurality of power sources are provided and the plurality of network channels includes more than one power channel, each power channel having different power supply characteristics, and the conversion unit includes a corresponding plurality of signal terminals for supplying power to the device. The appropriate power supply for each device is selected by the configuration unit, by routing the power lines of the device to the power terminals on the conversion unit supplying the desired power levels.

Preferably, each power channel supplies power at a different voltage. Advantageously, the at least one power channel is a DC supply, although AC supplies may be appropriate in other cases. In particularly preferred examples, the power channel(s) include one or more of: a +24V/ground DC supply; a +15V/ground/−15V DC supply and a +5V/ground DC supply. For example, the power lines may be: +24V; ground; +15V; −15V; +5V and ground, any combination of these lines being selected by the configuration unit to provide the appropriate power supply.

Advantageously, the interface module further comprises a power supply interface section adapted to decouple the one or more power channels and regulate power supply to the conversion unit.

In a particularly preferred embodiment, the device connector comprises a plug or a socket for direct connection to the device, preferably a 15-pin or 25-pin plug or socket. In other words, the interface module connects directly to the device with no other components between the device connector and the device. In particular it is preferable that the plug or socket is directly connected to the interface module without the use of a cable. This does away with the need for specialised cabling, the interface module effectively forming an extension of the device itself.

Preferably, the conversion and configuration units are housed within a body of the device connector. Thus the interface module can be affixed directly to the device. For example, the units could be fitted within a standard plug or socket housing so as to take up no additional space. Advantageously, the module further comprises fixing means for locking the interface module rigidly to the device. For instance, thumb screws enable the module to be easily yet securely affixed to the device.

The invention further provides a controller network comprising one or more devices and a controller for control of the devices, each of the devices being connected to the controller via an interface module according to any of the preceding claims. One interface module is preferably provided for each respective device. However, there may be additional devices which operate according to the same data protocol as the controller network and so it may not be necessary to connect such additional devices through interface modules.

Preferably, the controller network comprises a CANbus bridge between the interface module(s) and the controller. Advantageously, the controller is adapted to supply and/or receive data in serial format.

In preferred embodiments, the controller network further comprises at least one power source, power being supplied to the one or more devices from the at least one power source through the network. Advantageously, data communication and power are provided to each device through a common connector.

Preferably, the controller is a programmable logic controller, or a computer. Advantageously, the controller is adapted for synchronous control of the devices.

The devices could each be individually connected to the network via their respective interface modules. However, preferably, the network further comprises at least one distribution node, each distribution node being adapted to connect a plurality of interface modules to the control network.

Also provided by the present invention is a tool, preferably a thin film processing tool, still preferably a thin film plasma processing tool, comprising a controller network as described above. In this case, the device(s) in the network may include heaters, turbo-pump controllers, valve controllers, etc.

In particularly preferred implementations, the above-described interface module further comprises a memory for storage of control messages from the controller. The interface module may be further adapted to action the stored control messages upon receipt of a trigger message from the controller.

Examples of interface modules and controller networks in accordance with the present invention will now be described with reference to the accompanying drawings, in which:

FIG. 1 shows an embodiment of a controller network;

FIG. 2 schematically shows an embodiment of an interface module in terms of its functions;

FIG. 7 depicts examples of communications which may be supported by a controller network; and FIG. 8 shows a further example of a controller network.

Described hereinafter are embodiments of controller networks for controlling devices such as embedded microcontroller devices. The network may be referred to as a 'Ubiquitous bus' (U-bus) network. The network can support a standard network protocol, for example a multi-drop serial communications link such as RS485, as well as control inputs and outputs suitable for the application. For instance, a tool such as a chemical vapour deposition (CVD) chamber may have devices including:

A turbo-pump controller, requiring a RS232 serial communications interface and a device-specific protocol;

A mass flow controller, requiring analogue demand and read back in addition to digital on/off controls and +/−15V power supplies;

A pressure gauge, requiring a RS232 interface to a device specific protocol and a +24V power supply; and A valve controller, requiring digital outputs and digital readbacks, operating at +24V.

Other examples of applications for the system are reactive ion etching apparatus, plasma etching apparatus, plasma enhanced CVD apparatus, hydride vapour phase epitaxy apparatus, sputter deposition chambers, ion beam deposition chambers and ion beam etching apparatus.

The disclosed configurations allow greater flexibility in connecting such multiple OEM or bespoke devices to a network and providing each with the necessary communications. In addition, power may optionally also be delivered over the U-bus network, across the same cable as the data, such that no separate connection for power is required to the devices, thereby minimising the installation time and part count.

Figure 1:
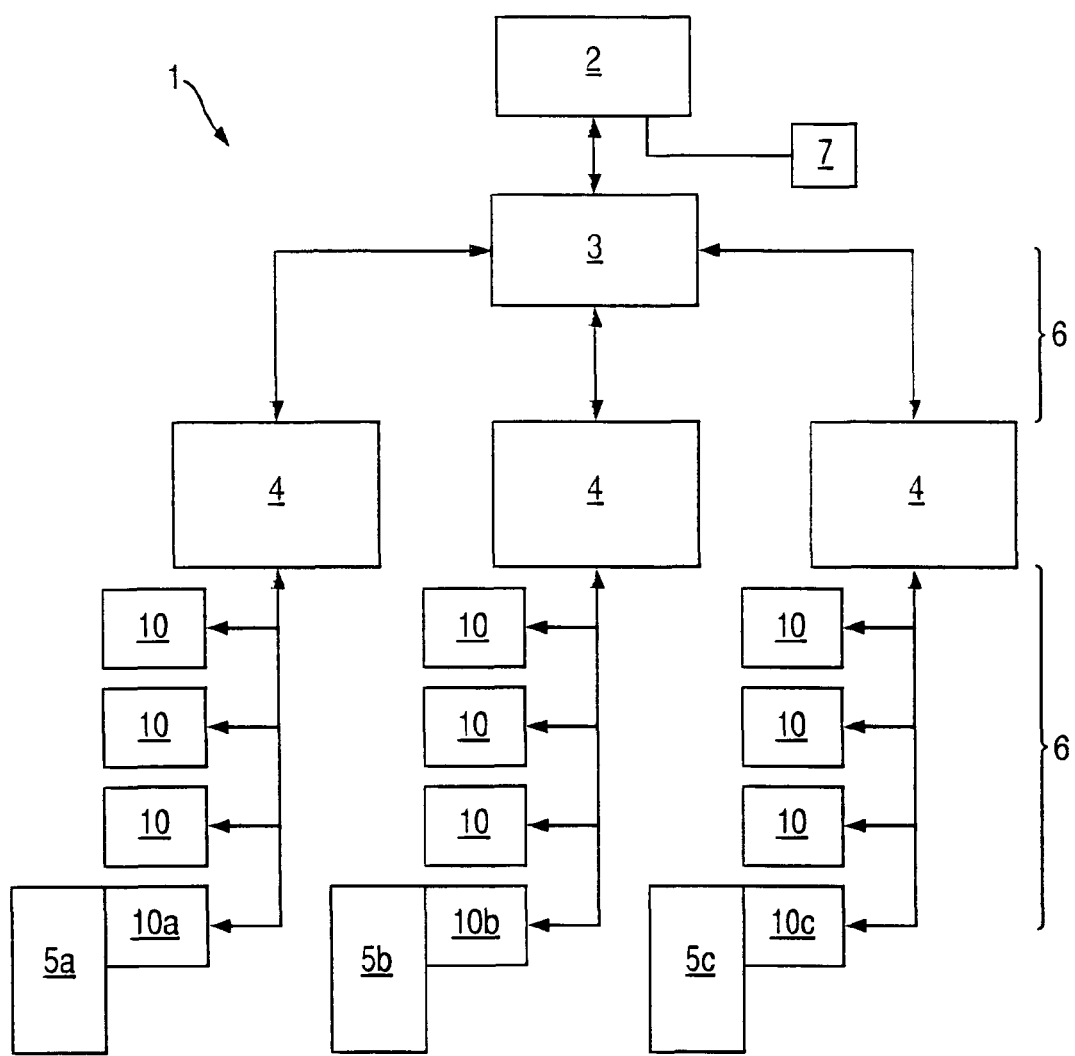

FIG. 1 shows an embodiment of a synchronous controller network 1. In this example, the network is controlled by a controller 2 in the form of a programmable logic controller (PLC) or a computer, which is adapted to provide synchronous control to a number of devices 5. The controller 2 is connected via a CANbus bridge 3 to a number of optional nodes 4, which will be described in more detail below. Each OEM device 5a, 5b, 5c is connected directly to an interface module 10, which may be termed a "Ubiquitous module" (U-module). In FIG. 1, only three devices 5a, 5b, 5c are shown for clarity, connected to the network via corresponding U-modules 10a, 10b, 10c. However, in practice each U-module 10 will be connected to a respective device 5. Each U-module 10 is connected via a U-bus cable 6 to a distribution node 4, each node 4 being capable, in this example, of taking eight U-module connections.

In this embodiment, the U-bus 6 consists of eight network channels (i.e. eight lines or wires), providing a common cable for both data and power. The channels include:
1. Serial data (RS485)
2. Serial data (RS485)
3. +24Vdc power
4. Ground
5. +15Vdc power
6. −15Vdc power
7. +5Vdc power
8. Ground Power for lines 3 to 8 is supplied by one or more power supplies 7 provided to the network. This set of power supplies covers the different supply requirements of most OEM devices 5. However, alternative power channels at different voltages or NC supplies may be appropriate in some cases.

It should be noted that whilst, in this case, the network operates according to a serial data protocol, the present invention could equally be implemented in a parallel data network, as will be appreciated by the skilled man.

Between the distribution nodes 4 and the controller 2 a conventional CANbus bridge structure 3 is implemented. In the example of the structure layout shown in FIG. 1, a PLC 2 is connected to the distribution nodes 4 via CANbus bridge 3 which then feed the interface modules 10 via the U-bus 6. The CANbus (operating between the controller 2 and the CANbus bridge 3) supports the internationally recognised standard CAN protocol (ISO11898), with the bridge 3 providing an interface between the CANbus protocol and the U-bus protocol (described below). The PLC 2 in FIG. 1 is used only as an example and should in no way limit the scope of the invention. For instance, a computer could be used as the controller instead.

In the network 1, the three exemplary devices 5a, 5b and 5c have different input/output data requirements. For instance, device 5a may require analogue inputs and generate analogue outputs, device 5b may require digital inputs and generate digital outputs, and device 5c may require serial data inputs and outputs, which may or may not operate on the same protocol as the Ubus 6. The devices may also require different power supplies.

Each of the U-modules 10a, 10b and 10c is arranged to convert data from the U-bus protocol into the format(s) required by its corresponding device 5a, 5b or 5c. As described in more detail below, this is achieved by equipping each interface module with a conversion unit, for performing the necessary data processing, and a configuration unit which configures the module to the specific device 5a, 5b, 5c. The conversion unit is generic, in that it is typically compatible with more than one of the devices in the network: for example, a module 10 having a conversion unit adapted to provide analogue inputs/outputs will be suitable for use with device 5a as well as other devices 5a', 5a" (not shown), which also require analogue inputs/outputs though may have a different configuration of device channels (and potentially different power supply requirements). In some implementations, the conversion units of all the interface modules 10 could be of the same design, and provide the same set of analogue, digital and serial inputs/outputs as well as multiple power channels.

However in practice it is preferred to provide a small number of different conversion units: one for devices requiring mainly analogue inputs/outputs, one for devices requiring mainly digital inputs/outputs, and one for devices requiring mainly series data inputs/outputs. A further version of the conversion unit may be supplied for devices incorporating sensors, such as temperature sensors. Hence the interface modules 10 shown in FIG. 1 in fact comprise a mixture of different module types, as necessitated by the requirements of the devices 5. The network can therefore be set up to control various mixed analogue, digital and serial devices. Where a device is directly addressable by either the CANbus 3 or the U-Bus 6 protocols, a conversion U-module is not required.

Figure 2:
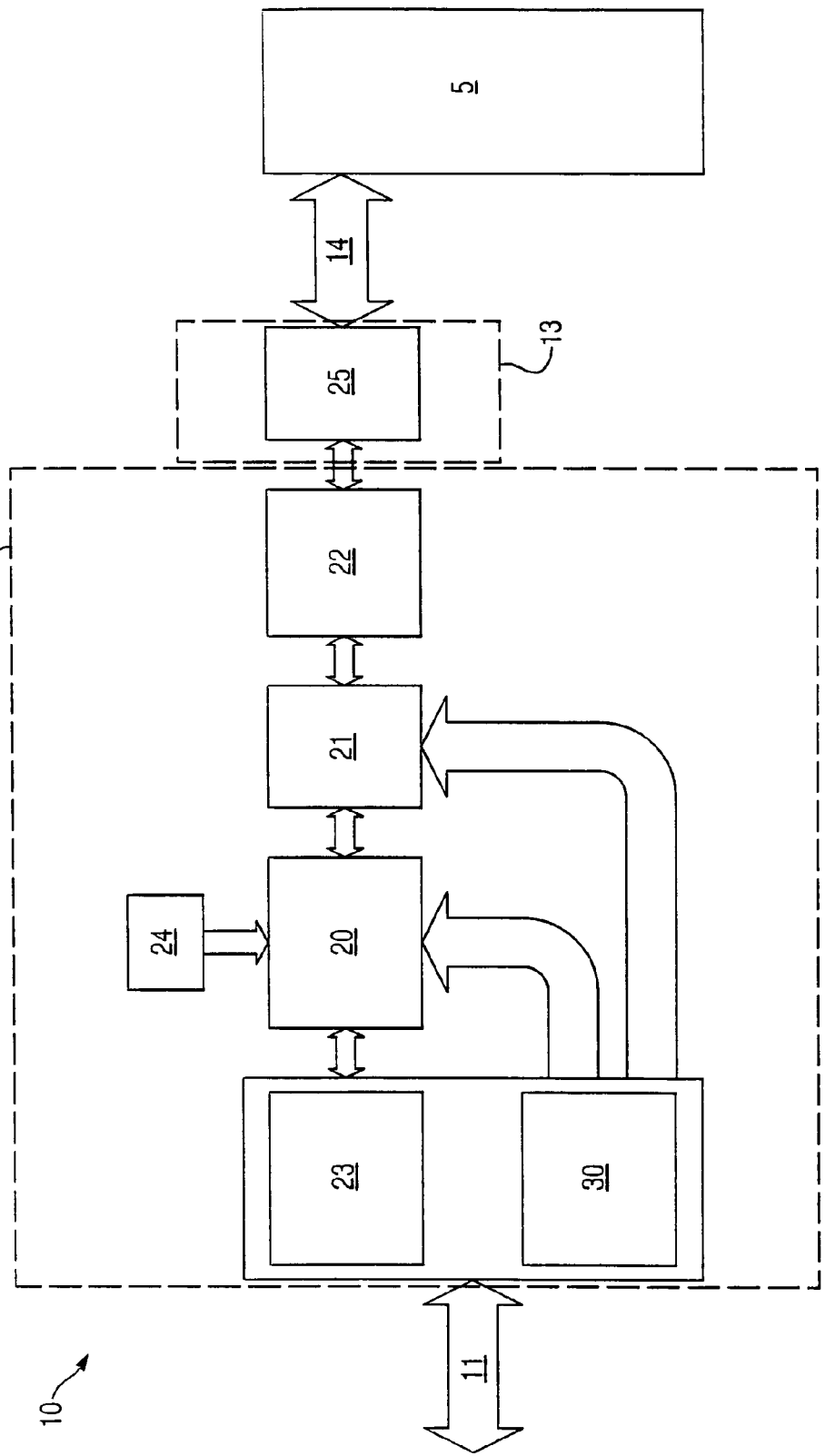

FIG. 2 shows the functionality of a general interface module 10. As indicated above, the module comprises a conversion unit 12 and a configuration unit 13. The conversion unit 12 receives the network channels 11, for example the eight lines of the configuration described above. Device channels 14 connect the interface module to the device 5. Each device channel enables the transmission of data or power to (or from) the device. Typically, 15 or 25 device channels may be supported.

The conversion unit 12 processes the signals from network channels 11 into formats suitable for the device 5 and the resulting processed signals are output at signal terminals represented by block 22. These signal terminals may include one or more data outputs (for transmission to the device 5) in analogue, digital and/or serial formats, as well as multiple power channels and inputs configured to receive data from the device 5 in analogue, digital and/or serial formats. Signal terminals are provided for connection to all power supply rails, every available input or output point and, in some cases, a selection of other circuit connections. For example, the conversion unit could provide any of:

Biasing or loading terminals to ensure that specific levels are maintained if the device 5 (and interface module 10) is disconnected from the network;

Connections for arranging digital outputs to be sourcing (driving high) or sinking (driving low) and/or selecting the operating voltage of the digital outputs (which are provided across a wide voltage range in any case);

Connections for selecting a particular gain for an analogue input or output channel; and Additional channels to allow for programming and testing of modules.

The conversion unit is therefore generic in that the signal terminals provide data connections and power supplies which can be used by more than one specific device 5.

Configuration unit 13 is disposed between the device channels 14 and the signal terminals 22 and is the only component which is specific to the particular device 5. The unit 13 is physically detachable from the conversion unit, and preferably from the rest of the interface module 10, so that it can be replaced in order to configure the module 10 to the specific device 5. The configuration unit 13 includes routing means 25 for connecting selected device channels 14 to selected signal terminals 22. Typically, not all of the signal terminals 22 will be selected for connection to the device. Similarly, in many cases not all of the device channels 14 will be required to be connected. The configuration unit is designed so as to provide the device channels with the appropriate inputs and outputs of those presented by the conversion unit, as well as the desired power channel(s). Preferably, the configuration unit consists solely of routing means, so that it is an inexpensive, easily replaceable component.

The conversion between the data protocol supported on the U-bus 6 and the format(s) required by the device 5 is performed by a microcontroller 20, programmed accordingly. The microcontroller can be chosen from a broad range of possibilities to allow the optimum selection of integrated I/O, size and price. Choosing the appropriate integrated I/O enables the module 10 to be kept small enough to attach directly to the target OEM device 5. For example, an "ARM 7" core within devices from Analog Devices, Inc. has been found suitable for analogue capability, and devices from NXP Semiconductors for best digital capability. However devices based on alternative architectures would be equally suitable.

Where the network protocol is a serial data protocol (as in the present example), an appropriate serial data interface 23 may also be provided. This may preferably include electromagnetic interference (EMI) protection.

The conversion unit 12 may further include input and output drivers, represented by section 21. The output drivers convert the output of the microcontroller 20 levels to the 'industrial' levels required by device 5, which will be supplied at the signal terminals 22. Digital modules may also incorporate, in the output drivers, fault detection circuits allowing open circuits and short circuits to be identified. For example, the current of an output can be monitored in the ON and OFF states, and compared with known or expected values. Allowing a very small current to flow in the OFF state will allow detection of an open circuit. Control circuits which implement this function are well known to the skilled man. Analogue modules may likewise incorporate a circuit allowing an approximation of the load impedance of the device 5 to be determined. Input circuits provide scaling of the expected voltage to be within the range of the microcontroller 20 inputs and in addition provide a level of protection to the microcontroller 20. All I/O lines may be provided with EMI protection.

The interface module 10 may also be provided with an address switch 24, which preferably forms part of the conversion unit. This can be accessed by a user to set the network address of the device 5. In other examples, the address could be pre-programmed. The interface module 10 will thus be associated with a single network address corresponding to the particular device 5 to which the module is attached.

Where power is also supplied across the network, the conversion unit 12 is also provided with a power supply unit (PSU) interface 30. The PSU interface 30 may incorporate functions including: EMI protection and decoupling for each input supply; local regulation of microcontroller supply rails; and potential dividers to allow monitoring of supplies using analogue inputs implemented in the microcontroller 20.

Figure 3:
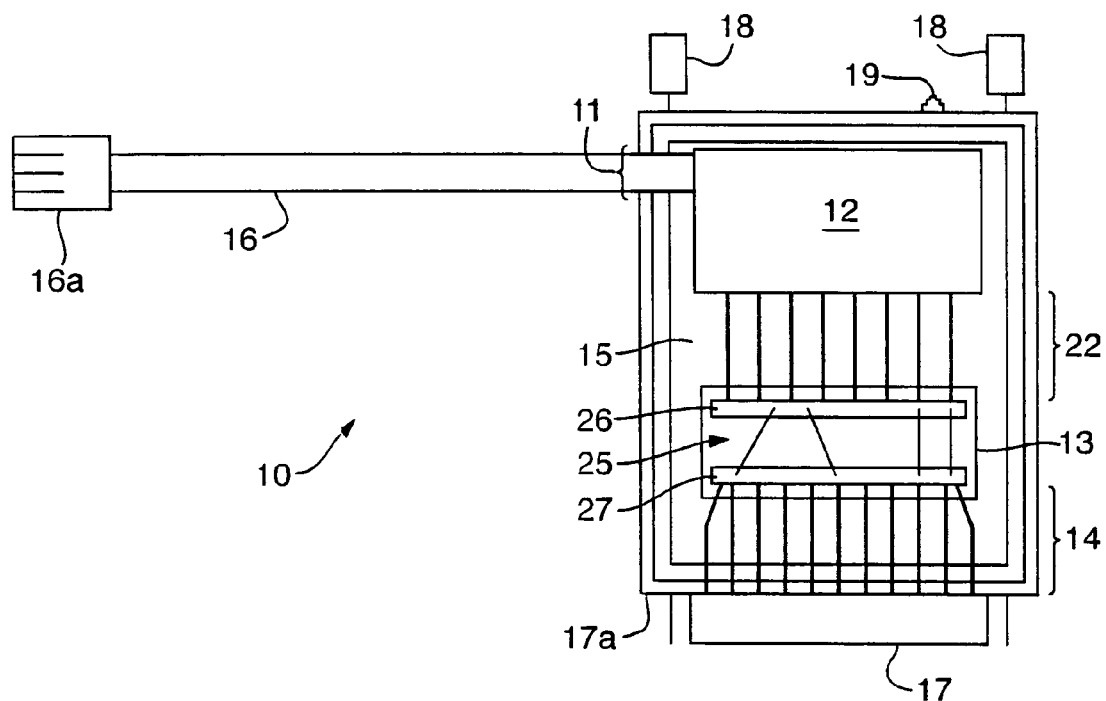
FIG. 3 depicts an embodiment of an interface module showing its main components.
Figure 4:
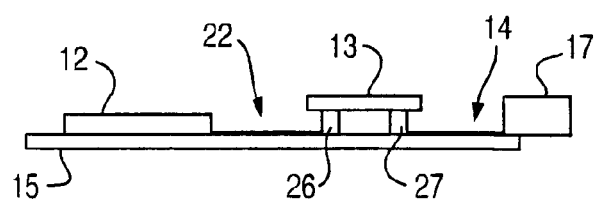
FIG. 4 shows a partial cross-section through selected components of the interface module of FIG. 3.

FIGS. 3 and 4 show an exemplary U-module schematically in terms of its main physical components. It should be noted in particular that the number of device channels 14 and signal terminals 22 shown is purely exemplary and any number of each could be provided.

The conversion unit 12 and configuration unit 13 are disposed within a housing 17a. The conversion unit 12 is connected to the U-bus network by a connector 16, which here takes the form of a cable (e.g. an eight line cable), permanently affixed to the housing 17a. The network channels are therefore delivered directly to the conversion unit 12. The cable 16 is preferably of a fixed length on all modules 10 and is provided with a plug 16a such as a RJ45 plug for quick installation onto the network.

The conversion unit 12 is configured on a PCB 15. In this case, the PCB 15 also supports connections with the device channels 14 which are delivered to the module by a device connector 17, which matches a corresponding connector on the device 5 (not shown). The device connector 17 is typically a plug or a socket, such as a D-sub connector, having a number of pins corresponding to the device channels. The PCB 15 does not connect the device channels to the signal terminals 22 and so the device channel connections could be provided separately (e.g. on a separate PCB). However, the present embodiment provides a convenient arrangement.

Between the device channels 14 and the signal terminals 22, the removable configuration unit 13 is provided. The configuration unit 13 provides routing, represented at 25, for connecting selected device channels 14 to selected signal terminals 22. Conveniently this may be achieved using a second PCB provided with appropriate tracks, known as a header board. First and second connectors 26, 27 may be provided for connecting the configuration unit to the main PCB 15, the first connector being matched to the signal terminals 22 and the second to the device channels 14. In alternative embodiments, a single connector unit could be provided, combining the functions of connectors 26 and 27. For instance, in a preferred example, a 80-way connector unit may be used, selected pins being used to connect to the signal terminals, and other selected pins being used for connection to the device channels. The two groups of selected pins provide the functions of the first and second connectors 26, 27 shown in FIGS. 3 and 4. The connector(s) enable the configuration unit 13 to be straight-forwardly detached from the conversion unit 12 and the device channels 14, and replaced with an alterative unit, with a different arrangement of routing tracks, as necessary. In other examples, the configuration unit 13 could be formed integrally with the device connector 17, and a single connector provided for joining the configuration unit to the signal terminals 22, in which case both the connector 17 and configuration unit 13 would be replaced when re-configuring the module to a new device.

In the present example, only four of the signal terminals 22 are selected for connection to four corresponding device channels 14, as represented by routing 25 on configuration unit 13. These may consist, for example, of one analogue input, one analogue output and +V/−V power lines. The same module 10 can be reconfigured for use with a different device 5 by replacing the configuration unit with another board having different routing. For example, two additional routing lines could be provided to supply the device additionally with a digital input and digital output.

In the majority of cases, the required mapping between device channels 14 and signal terminals 22 can be achieved on the configuration unit 13 by simple track connections without additional components. However in some cases additional components may be included on the header board to implement additional facilities, for example additional scaling for a low level signal or to implement an interface mode not available directly from the conversion unit 12—e.g. current loop input and output for devices which use a varying current rather than a varying voltage to signal demand and read back, which can have advantages in reduced susceptibility to electrical noise.

The module 10 plugs directly into the OEM or bespoke device via the connector 17 without the need for any cable, thereby minimising the cabling required. The present inventors have found that advances in electronic miniaturisation, and the use of surface-mounted printed circuit boards (PCBs) have made it possible to fit the electronics of the U-module 10 inside a connector housing, fitting directly to the OEM device. Hence, preferably, the housing 17a is the standard housing of the connector 17 (i.e. the housing in which the plug/socket is mounted). These are typically robust aluminium casings and so protect the U-module whilst remaining compact. The module has easy access thumb screw fasteners 18 to affix the module 10 securely to the device 5.

Hence the described interface module or "U-module" 10 provides a simple housing design for connection directly to the OEM or bespoke device, which is easy to install or remove. The conversion receives the electrical power supplies and the U-bus serial commands via network channels 11, and converts them to the analogue, digital and serial connections for an OEM device. The present inventors have found it possible to cover the needs of the majority of OEM devices with four styles of conversion unit. For example, the "Ubiquitous digital interface" (UDI) conversion unit has 8 digital inputs and 8 digital outputs. Other versions are detailed below. By configuring the U-module interface to the OEM device using a configuration unit in the form of a header board, which can be quickly removed and installed, the number of different parts required for an installation is minimised.

Analogue Control

A first version of the interface module 10 is termed the "Ubiquitous General Interface" (UGI). The UGI is primarily used for connection from the U-bus network 6 to devices 5 that require mainly analogue communications, but may also require digital inputs or outputs. For example, devices such as mass flow controllers, gauges, power supplies, RF power sources and pressure controllers typically require analogue inputs. The conversion unit of the UGI module is arranged to provide up to four analogue input terminals (to the device) and 3 analogue output terminals (from the device) plus up to 8 digital input and output terminals.

The flexibility of the conversion unit therefore allows several channels of digital communication to exist alongside the analogue channels in the UGI module. This gives the UGI module great flexibility in communicating with many different types of OEM or bespoke devices.

The selection as to which or the inputs/outputs are used is made by adding the appropriate configuration unit 13 to the module which configures the pins required for correct connectivity to the device. The communications channels can therefore operate to read or write data in analogue or digital form. The configuration unit is small and inexpensive and the only non-generic part that is required to turn the generic UGI module into a controller for a particular device 5.

Digital Control

Where the device 5 requires only digital input and/or outputs then the "Ubiquitous Digital Interface" (UDI) module 10 can be used. The UDI conversion unit can support up to 8 digital inputs and outputs. The UDI also has the functionality of detecting open or short circuited connections for greater diagnostics and fault finding. Also up to 8 frequency counters can be implemented in place of digital input channels if required.

The UDI module 10 may be used with devices such as valves and electrical switches, for example. Frequency counters, if provided, may be used with devices where rotation speeds or pulses must be monitored, such as water flow monitors.

In general, power is supplied directly by the switched output, rather than using a separate power channel (i.e. the data channel also supplies power). In most cases, device requirements are for 24V input and output, but the conversion unit allows for anything from 5V to 24V.

Serial Control

Serial control of a device 5 is managed through the "Ubiquitous Serial Interface" (USI) module 10. The USI conversion unit is pre-programmed with the relevant serial data language and code in order to operate the serial device 5. The USI has been developed to support RS232, RS422 and RS485 serial protocols although other formats can be handled in a similar manner. The USI also supports Modbus and can also be easily adapted to use other communication protocols such as Prof ibus and OEM specific protocols.

Thus the hardware constituting each USI may be identical, with different firmware being installed as necessary during manufacture of the modules 10 to account for the different serial protocols and different manufacturer languages that the various devices require. Nonetheless the selection of the appropriate channels and routing to correct device pins is still performed by the device-specific configuration unit.

Typically, USI modules would be used for more complex devices requiring a variety of input and output functions, such as Turbo-pump controllers. However, the USI could also be used for other devices including temperature controllers, gauges and power supplies, in place of the analogue equivalents.

Sensor Control

For devices including sensors, such as temperature sensors, the conversion unit may include further processing capabilities. For example, a sensing circuit may be provided which is adapted to generate a signal corresponding to a parameter measured by the sensor. For instance, the "Ubiquitous Temperature Interface" (UTI) module conversion unit is able to read temperature sensors directly and provide control signals for analogue, phase angle, PWM and solid state power controllers. The generated signal may be passed back to the network 6 or could be returned to the device 5 as an input to a local controller.

For example, a device such as a heater may include a temperature sensor. The UTI may be configured to receive the measured temperature, compare it to a predetermined value and, depending on the device requirements, output an analogue or digital signal to the heater for use in controlling its power output.

A status indicator 19 may also be provided on every U-module 10. The status indicator is used to alert the user to open or short circuited paths at the module output port as well as for displaying bus status and indicating power supply problems. The status indicator 19 preferably comprises a multi-colour LED although any other light source or optical display, such as a LCD, could be used instead.

The status indicator 19 is controlled by the microcontroller 20 in response to information from the fault detecting circuits and/or load impedance circuits included in the input/output section 21 (described above), as well as from the PSU interface 30.

In a preferred implementation, the status indicator will display a green colour when there are no problems detected. If any power supply is out of tolerance or an open or shorted path is detected then the status indicator flashes amber. In the event of a communication failure, the status indicator flashes red. This simple diagnostic tool is effective for determining wiring faults without having to manually measure circuit nodes. Hence this adds to the overall transparency of the system when concerned with troubleshooting or fault-finding.

As described below, the U-bus protocol defines a status byte which can be read by the module 10 in the same way as the analogue and digital inputs. This enables additional information regarding the fault to be read over the U-bus on demand. The information available will guide the engineer to the fault via two levels of information. At the first level, a status byte generated by the microcontroller 20 will resolve the problem into one of a number of categories. For example, the categories may be: +15V supply OK; −15V supply OK; +24V supply OK; digital outputs all OK; analogue outputs all OK; analogue outputs within tolerance; and no recent reset (used to detect modules that have recently been added to the network and as an additional fault diagnostic). The +5V supply is generally not included in this set since, if it is out of tolerance, the module 10 will not operate. The actual voltage level of the +5V supply can however be monitored as described below. For each of these categories, further diagnostic readings (as traditionally measured with a digital voltmeter) are available. For example, the conversion unit 12 can be set to send the measured voltages to the network in place of its normal read backs by sending a specific command code to the module 10. Another code can be used to interrogate the module type and firmware revision code. Open circuit and short circuit diagnostics are preferably always available from a UDI as an additional status word, as is the output impedance of an analogue output. Hence, the supply voltage seen by the module 10 can be measured for each of the relevant supplies, short or open circuit conditions can be resolved to a single output pin and the load impedance of analogue outputs can be measured. In this way, the fault can be isolated to a single supply or output without removing connections or covers.

The full set of signals which may be provided in this example via the indicator 19 is shown below.

| LED Colour | Description |
| --- | --- |
| Red | Quick isophase red flashing indicates that the module 10 is not communicating with the network. All outputs will be OFF (0 V) in this state |
| Amber | Slow occulting amber light indicates that the module is communicating with the network, but that some parameter is outside normal tolerances. In general this is due to power supply out of tolerance or there is an output which is shorted or open circuit. The status byte can be read over the network to determine the exact nature of the problem. Operation of the module may not be affected. |
| Red-Green-Red-Green | Calibration error - the module has failed to complete a self calibration routine after programming. Module requires re-calibration or repair. |
| Red-Red-Green | Two or more modules on the bus have the same address selected. |
| Green | All connections OK and network communicating |

All of the different types of module 10 can be connected to the CANbus bridge 3 via distribution nodes 4. In an alternative embodiment, the function of the CANbus bridge 3 could be combined into the or each distribution node 4.

Figure 5:
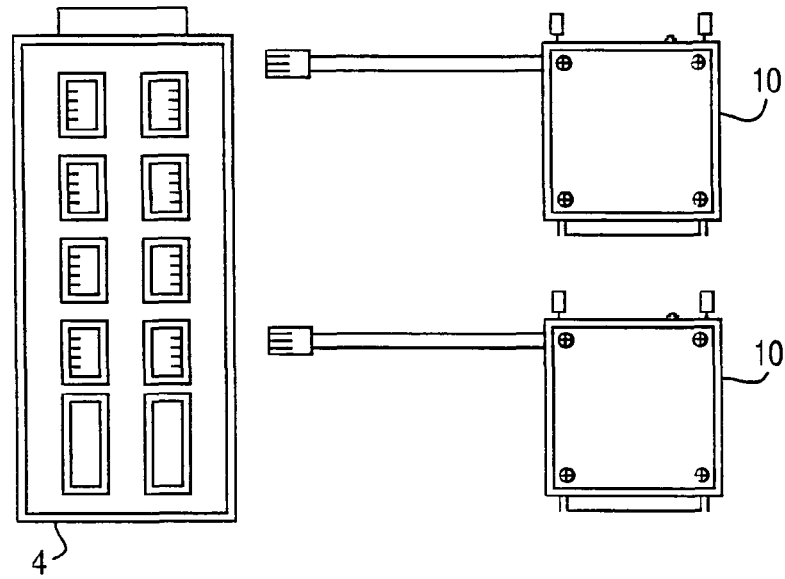
FIG. 5 shows a node module for use in the controller network, and two interface modules.

The distribution node 4, shown in more detail in FIG. 5, is designed for simple low-cost installation and simple configuration. A single distribution node will have, for example, eight RJ45 style network ports. The 8-way node is housed in a durable aluminium housing and may also contain auxiliary power ports for maximum installation flexibility. For example, in some cases, the total supply loading of all devices 5 connected via interface modules 10 to the distribution node 4 may exceed the capability of the distribution node supply cable. In this case it is possible to inject additional power via these auxiliary ports to make up the deficit. In other cases, additional power could be available from these ports to support devices that need no control, such as permanently-operating fans or illumination, etc.

To add a device 5 to the control network 1, the interface module 10 is connected to the OEM or bespoke device 5 and the RJ45 connector 16a is connected to the 8-Way Distribution Node 4, see FIG. 5. This is advantageous since no tools are required and no hand made connections are needed. If the distribution node is fully populated then another distribution node can be easily added to the network. Similarly, if the device requiring connection is remote with respect to all present distribution nodes then another 8-way node can be added to the system.

The module may plug into any of the 8 ports on the distribution node. However, the module 10 must have the correct node address set which can made by a small 16-way switch 24 inside the module housing. The switch is accessed by a module access cover.

The distribution nodes 4 route the U-bus network to each port. The nodes may also provide over-current protection for the modules 10 and could incorporate circuits to minimise the impact of reflections on the bus data lines. The modules 10 can preferably be plugged into or removed from the nodes 4 without switching the system off—i.e. they are "hot pluggable"—the hardware and software being designed accordingly, as will be appreciate by the skilled man.

Figure 6:
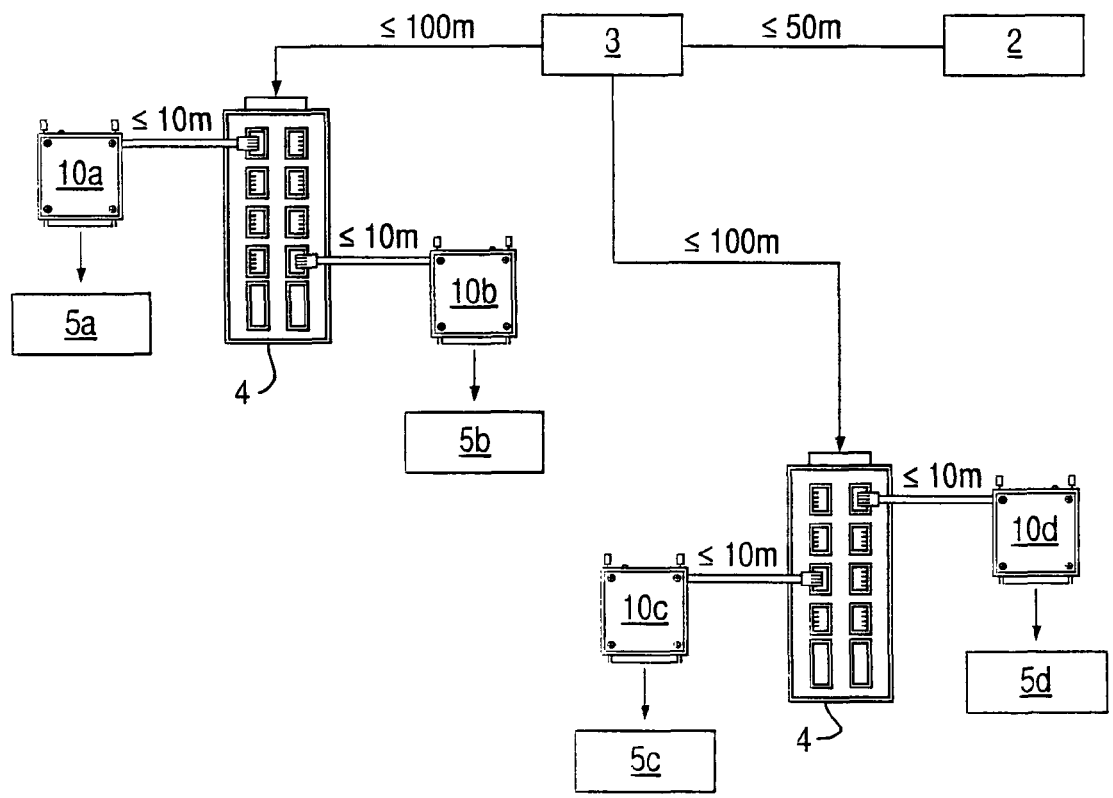
FIG. 6 shows a further embodiment of a controller network.

A further example of how the interface modules 10 and distribution nodes 4 can be used to quickly build a controller network 1 is shown in FIG. 6. The U-modules 10 are fastened to the OEM or bespoke devices 5 via the thumb screws 18 and then connected to the 8-way node 4 by plugging the RJ45 connector into an available port. A configuration unit 13 suited to the respective device 5 will be required for each of the interface modules 10, which will determine the pin configuration for the specific device.

All of the interface modules 10 come with a fixed length of network cable 16 permanently connected to the module case 17*a*. In such instances where an extension of this cable is required a standard socket-socket adapter can be used with a suitable length of standard network cable.

Power to the devices 5 may also be supplied via the 8-way distribution nodes 4. This saves routing cables through the system to a separate power supply making the system adaptable to designer requirements.

Connection from the 8-way node 4 to the CANbus bridge 3 can be made using standard pin-to-pin cabling for low cost installation. This simplifies the procurement process and spares or upgrades can be stocked or bought in quickly.

In this example, the limit of the physical distance between the modules and the distribution nodes is 10 m. This limit is imposed by circuitry provided in the distribution node which minimises the effect of reflections on the rest of the network. As with any wired network, using a longer cable than the maximum specified could result in less reliable operation. The 8-way distribution node 4 can be separated from the CANbus bridge 3 by up to 100 m of cable if required. The CANbus itself preferably forms a linear daisy chain circuit not exceeding 50 m: the CANbus specification lays down limits on the timing of signals to ensure detection of errors on the network. The cable length, cable type and transmission speed all contribute to defining a maximum cable length. Using FIG. 6 as an example, the maximum distance between the two interface modules 10*a* and 10*d* could be 220 m if required and a suitable CAN interface, such as a PLC 2, could be situated 50 m from the CANbus bridge 3. There is no limit to how close together the modules may be located other than the physical size and placement of the OEM devices and interconnectors.

The described system achieves a large number of advantages, including:
  Minimising the number of hand wired connections required;
  No wire stripping involved;
  Wire labelling is replaced with numbered modules;
  No custom cables required;
  Minimises field service parts required;
  Reduces special tools required;
  System wiring time is greatly reduced;
  Possibility of wiring faults is dramatically reduced;
  Only a small number of different modules types for all combinations of serial, digital and analogue communications—greatly reduces different part numbers;
  Sensor control signals can be processed local by the module;
  No separate power connection is required to the devices;
  Since the U-module plugs directly into the device, the number of separate cables required is minimised; and
  The modules are 'hot pluggable', permitting repairs and upgrades to be performed without the requirement to shut down the machine.

U-Bus Protocol

The protocol on which the U-bus 6 is preferably operated will now be described. It will be appreciated by the skilled man that any suitable protocol could readily be applied.

In the present example, the U-bus 6 is a serial communications interface using a single pair RS485 network running at 115200 baud. The network is a half duplex network, allowing data transmission between the devices and the CAN bridge in both directions though not simultaneously. For the detection of transmission errors, an even parity bit is preferably provided. The bus can employ RJ45 connectors and four pairs of screened cables. This configuration allows distribution of power supplied via a single cable/connector.

As mentioned above, each device has a network address. In the present example, a single U-Bus is limited to 15 devices although this can be expanded by suitable modification of the protocol. The module address (between 1 and 15) is set within the module using a hexadecimal switch. This format allows the modules to be tested with a standard serial interface if required. HyperTerminal™ by Hilgraeve Inc., with an RS485 converter will be sufficient as a minimum requirement. The last remaining address (e.g. 0) is reserved for broadcast.

Messages on the network are provided in the general format:
  #AFhhhh\r
where:
  # is the "attention" character used to signify the start of a new message;
  A is the module address in the form of a single hexadecimal character;
  F is a function register in the form of a single hexadecimal character;
  hhhh is a sequence of four hexadecimal characters defining the value of the selected function register; and
  \r is the "enter" character, terminating the message.

Thus each message commences with a preamble consisting of the address A of the module for which the command is intended, followed by a digit F defining the function of the message within the module. The most significant bit of the hexadecimal digit F defines "read" (0) or "write" (1). The three remaining bits define one of up to eight 16 bit registers within the module. Thus, all values of F in the range 0 to 7 (i.e. 0001, 0010, "0xxx") define read functions, and all values of F in the range 8 to F (i.e. 1000, 1001, "1xxx") define write functions.

For example, the read registers may include functions such as "read status", "read analogue channel x", and "read output status". Thus, in response to a message such as #A3 (the reminder of the message format being omitted since this is a read function and hence no data need be supplied to the module), the output of channel 3 (for example) may be read back from the module to the network.

Likewise, write registers may include functions such as "write to analogue channel x" and "write to digital outputs". In most cases, the data sequence hhhh defines the value of the selected function, i.e. the data to be written to the selected register, and ultimately controls the outputs provided on the signal terminals. For example, the message #A9hhhh\r may control the module to output the value hhhh on analogue channel 1. In such cases, the whole of sequence hhhh may be referred to as the "demand"—i.e. the particular value or code that is required to be output on a selected channel.

Register 8 (the first write register) is used in this example to provide additional functionality. One half of the 16 bit register is used for control of the module's digital outputs, of which there is a maximum of eight. The other half of the 16 bit register is used for control of the interface module itself. Thus, in a message #A8h'h'hh\r, the first two digits h'h' represents a command to the interface module, and only the second two digits hh form the digital demand. Of course, any other register could be selected for this purpose.

The command field h'h' in register 8 can be used in a number of ways, including requesting the module to read voltage levels and carry out diagnostics. Particular uses of the command field h'h' are described in more detail below.

Write commands are acknowledged by the module with a "!" (acknowledged) or "?" (error). An invalid read request will also return a "?".

Errors in transmission are identified by parity checks along with checking the format of the received message. In the case of an error in the reply string, the controller will ignore the data and resend the command. If an error message ("?") is received by the controller, the command will also be resent.

All commands and responses allow for 16 bit resolution if required, enabling a range of 0 to 65535 (or −32767 to +32767 if the number is signed) for analogue outputs and inputs, or states for 16 digital outputs or inputs.

In the standard or default mode of operation, all demands hhhh (or hh in register 8) received by a module are output to the corresponding device immediately.

However, one problem which may be encountered results from delays in the network which may lead to control messages arriving at the addressed module 10 later than intended. This can lead to asynchronous behaviour with devices performing actions out of step with one another, and in the worst cases, in the wrong order.

Hence in a preferred embodiment, the interface modules 10 are further provided with a memory and are adapted for the storage of incoming control messages from the controller 2. The microcontroller 20 may be used to provide the memory.

The controller 2 is arranged to output control messages to one or more of the devices 5 according to the U-bus protocol described above, but instead of generating and outputting each message at the time at which the corresponding action is to be performed, the messages can be output at any time before the action is to be performed by the device. The interface module located between the network and the device to which the control message is addressed stores the message in its memory without passing it on for direct execution by the device. Any number of control messages may be stored by one or more of the modules 10 in this way. At a later time, the stored messages are actioned by the issuing of a trigger message.

Once a stored control message is "actioned", it may either be performed (i.e. passed to the device) immediately or after a predetermined delay has elapsed. Preferably, each control message itself defines whether the associated demand should be output immediately or after a delay, and if so, the duration of the delay. This can be used to take into account known differences in the response times of the various devices in the network, or to arrange a sequence of actions to take place on issue of a single trigger message. Thus a single trigger message may initiate multiple actions either simultaneously or with a defined set of delays. Alternatively or additionally, each interface module could be pre-programmed with a delay period to be applied to all stored messages (or all stored messages which indicate the need for a delay), and the delay period may vary between the interface modules, according to the nature of the associated devices.

Storage of control messages is achieved using the command field h'h' in the eighth register. When a module is required to switch from the default mode into the storage mode, the controller sends a message in the format #A8h'h'hh\r, where h'h' represents a number within a predefined storage range. In the present example this can be anything between 1 and 127 (inclusive). The module corresponding to address A receives the message and interprets the command h'h' as an instruction to store any demand also included in the message (i.e. the digital output values hh), and all subsequently received demands. The value of h'h' constitutes trigger information data. For example, if h'h' has the value "1", then the stored demands will not be output until a corresponding trigger, identified as trigger "1", is issued.

The module will continue storing all received messages so long as register 8 contains a storage command. Thus, operation of the module can be switched back to the default mode (i.e. performing incoming demands immediately) by supplying a command h'h' which is outside the predetermined storage range. For example, the value "0" may be used. The trigger information data can be adjusted for different incoming demands to be stored by changing the value h'h' to another value within the predetermined range.

When it is desired to perform stored action(s), the controller 2 generates a trigger message and broadcasts it to one or more, preferably all, of the devices 5. For example, the trigger message would typically be addressed with the address digit "0", which will be recognised by all of the devices in the network. The trigger message is otherwise of the same format as the storage command. For example, the trigger message could be #08h'h'hh\r, where h'h' again takes a value between 1 and 127. The value acts as an identifier distinguishing one trigger message from another. The trigger message is distinguishable from the storage command by the use of the broadcast address "0".

On receipt of the trigger message, the modules 10 respond by passing one or more of the stored control messages to their respective device, such that the corresponding actions are executed. In this way, a series of actions can be performed by one or more devices in quick succession, with no possibility of delays caused by the network.

The demands to be actioned by a trigger message are determined by the stored trigger data. When a trigger message is issued, all of the stored demands which designate that same trigger message will be output. For example, in the above case, the storage message identifies trigger "1", and all subsequent control messages received by the module are saved designating trigger "1". When a trigger identifying itself as trigger "1" is received, all of the demands corresponding to these saved control messages are output. Several commands may include the same trigger identifier, so that all such commands are actioned by one trigger message. Each module may store a plurality of commands corresponding to various different triggers.

FIG. 7 shows schematically examples of messages which may be issued by the controller (centre column) and the responses of two interface modules "a" and "b". Each message is designated M1 to M9 for ease of reference. It should be noted that, for clarity, this diagram does not show any acknowledgement or error messages sent between the modules and the controller.

The first message M1 is an instruction to module "a" to output the value hhhh on register 9, e.g. the first analogue output. This is performed immediately by the module "a" upon receipt. A second message M2 contains a storage command. This is recognised by the designation of register 8, which indicates that the first two hexadecimal digits, h'h', contains a command. The value of h'h', x, is between 1 and 127 such that the module "a" recognises this as an instruction to store both the accompanying demand hh (in register 8), as well as any subsequent messages, against trigger "x". M3 is a similar storage command addressed to module "b", identifying the same trigger "x".

Messages M4, M5 and M6 are demands to be stored in one or other of the modules. The module to which each is addressed stores the demand against the designated trigger value x. It will be noted that message M4 is identical to message M1 but the module will respond differently than before due to the intervening storage command M2.

Message M7 contains a new storage instruction addressed to module "b". In this case, the command h'h' contains a new value, "y" such that the accompanying demand hh and any subsequent demands are stored against trigger "y". However, in other examples, new demands for register 8 could be stored without changing the trigger data by maintaining the value "x" in the command field h'h'.

Message M8 is a first trigger message, identical to storage commands M2 and M3 except for the address field which is set to "0". Thus, all modules receive the message. Its designation of register 8 indicates that, once again, the first two hexadecimal digits h'h' represents a command to the module and, if their value is within the predetermined range (e.g. 1 to 127), this will be recognised as a trigger message. The trigger message is identified by the value of h'h', which in this case is "x". Both module "a" and "b" will respond by outputting the demands they have stored which designate trigger "x". Since both modules receive the trigger M8 at exactly the same time, their responses are synchronised. The remaining hexadecimal digits hh are ignored since no demand is generally transmitted with the trigger command. Conveniently, the digits hh are therefore set to 00. Additional functions could however be added if desired.

A second trigger message M9 may then be issued, having the same format as message M8 but a different value "y" in the command field h'h'. This too is received by both modules and corresponding stored demands are output in response. In this example, only module "b" has received a demand designating trigger "y" (as part of message M7) so there is no response from module "a".

In alternative embodiments, for instance where a greater number of module addresses is available, the trigger message could be implemented instead by setting the address byte to a "group" address, which a selection of the devices recognise as addressed to them. The addressed modules would then output all of their stored demands.

Once a stored message has been "triggered" and output, it may be deleted from the relevant register, such that if a second matching trigger signal is issued, the same command is not actioned again. However, in some preferred embodiments it is preferred that triggering of a stored message does not lead automatically to deletion, but rather that the stored message remains and will be actioned again upon receipt of another appropriate trigger. This is particularly useful whether certain sequences of actions are to be carried out repeatedly by the network (utilising one or more of the devices). As such, control messages corresponding to the actions to be performed in one cycle, including any necessary scheduling information, can be distributed to the relevant interface modules (connected to the devices to be used) once, and then triggered repeatedly, as many times as required. Thus, cycles of action can be carried out repeatedly with close correspondence of the timing of individual devices in each cycle whilst utilising a very small network bandwidth. Instructions as to whether a control message should be stored beyond triggering may be including in the control message itself (which, for example, could include information as to the number of triggering cycles it should be retained for), or a separate message could be issued by the controlled with instructions to delete all messages stored against a particular trigger. For example, a subset of the available values of the command field h'h' in the eighth register could be used for this purpose.

A further example is depicted in FIG. 8. This shows four devices 5*a* to 5*d* and four corresponding interface modules 10*a* to 10*d*, connected to a controller 2 via a CANbus. The network is shown in a simplified form but it could make use of nodes 4 as described with reference to FIGS. 1, 5 and 6 above.

The contents of each module's memory is shown within each module 10*a*-10*d*. At the instant depicted, the controller 2 has issued storage commands to all four modules, and 10 demands: A, B, C, D, E, F, G, H, I and J. Each of these has been received by the module 10*a*, 10*b*, 10*c* or 10*d* to which it is addressed. As such, module 10*a* has received four demands, 10*b* has received three, 10*c* one and 10*d* two. It will be noted that these can be issued by the controller in any desirable order.

The trigger data associated with each demand A-J is indicated in brackets alongside. It will be seen that demand A designates trigger "x", as does demand B, whereas demand C identifies trigger "z", and so on. The trigger identification data is set by the storage commands, usually received before a control message is issued (as discussed above, digital output demands may however be issued simultaneously with corresponding trigger identification data, since both make use of the eighth register).

The controller now issues a trigger signal "x" (the labelled being carried in the command field h'h') which is broadcast to all of the devices 5*a*-5*d*. In response, interface modules 10*a*, 10*b* and 10*c* will synchronously pass the stored commands identifying trigger "x" to their respective devices (i.e. output the corresponding demands at their signal terminals): device 5*a* will perform actions corresponding to commands A and B, device 5*b* will perform the action corresponding to command H and device 5*c* will perform the action corresponding to command D. Since the actions take place in response to a common trigger signal, received by the three modules at the same time, the actions will be precisely co-ordinated with one another. A further trigger signal could be issued to stop the modules performing the actions. Another trigger signal "y" could be broadcast to action commands E, F, I and G by their respective devices. In preferred embodiments, the trigger signal is broadcast to all of the devices such that all operate exactly synchronously.

Thus, the group of one or more devices to which each trigger message is "addressed" (via the trigger information data) can be changed by the controller 2 dynamically.

This method is preferably implemented using the interface modules described above with reference to FIGS. 1 to 6. However, it could be implemented on an otherwise conventional controller network, provided with interface modules comprising only a processor and a suitable memory, which need not include the conversion unit and configuration unit described above. Nonetheless providing interface modules which perform both of the described functions is much preferred.

The invention claimed is:

1. An interface module for connecting a device to a controller within a controller network, the controller being adapted to supply and/or receive data according to a network protocol, and the device being adapted to supply and/or receive data according to a device protocol, the interface module comprising:

a network connector supporting a plurality of network channels for connecting the interface module to the controller via the controller network;

a device connector supporting a plurality of device channels for connecting the interface module to the device;

a conversion unit arranged to receive the plurality of network channels from the network connector, and adapted to convert data between the network protocol and at least two device protocols, including that of the device, the conversion unit having two or more signal terminals for supplying and/or receiving signals to or from the device; and a configuration unit between the conversion unit and the device connector, adapted to configure the interface module to the device by routing selected device channels to selected signal terminals of the conversion unit;

wherein the configuration unit is separable from and removably coupled to the conversion unit such that the interface module may be configured for use with a different device by replacement of the configuration unit; and wherein the configuration unit comprises a first physical connector matched to the device channels and a second physical connector matched to the signal terminals of the conversion unit, and conductive tracks therebetween arran Ted to connect the selected device channels to the selected signal terminals across the configuration unit.

2. An interface module according to claim 1 wherein the plurality of network channels includes at least one data input channel for supplying data to the device, and at least one data output channel for receiving data from the device.

3. An interface module according to claim 1 wherein the plurality of device channels includes at least one data input channel for supplying data to the device, and at least one data output channel for receiving data from the device.

4. An interface module according to claim 1 wherein the conversion unit comprises a processor adapted to convert data between the network protocol and the at least two device protocols, and an input/output section adapted to adjust signal levels between a processor signal level range and a device signal level range.

5. An interface module according to claim 4 wherein the input/output section incorporates a fault detection circuit for the detection of open circuits and short circuits, and/or a load impedance circuit for determining the approximate impedance of a load.

6. An interface module according to claim 1 wherein the conversion unit is further adapted to detect faults in the connection between the interface module and the device.

7. An interface module according to claim 6 further comprising an indication means for indicating status information to a user, the conversion unit being further adapted for control of the indication means.

8. An interface means according to claim 7 wherein the conversion unit is adapted to actuate the indication means to indicate the detection of faults in the connection between the interface module and the device.

9. An interface module according to claim 1 wherein the conversion unit further comprises a serial data interface for communicating with the controller via the controller network.

10. An interface module according to claim 1 further comprising an address switch section for programming the interface module with a network address.

11. An interface module according to claim 1 wherein the configuration unit further comprises scaling means for adjusting the level of a signal between the device channels and signal terminals.

12. An interface module according to claim 1 wherein the conversion unit is adapted such that at least one signal terminal supplies analogue input data to the device, and at least one signal terminal receives analogue output data from the device.

13. An interface module according to claim 12 wherein the network protocol is a serial data protocol and the conversion unit is adapted to convert data between the serial data protocol and analogue format.

14. An interface module according to claim 1 wherein the conversion unit is adapted such that at least one signal terminal supplies digital input data to the device, and at least one signal terminal receives digital output data from the device.

15. An interface module according to claim 14 wherein the network protocol is a serial data protocol and the conversion unit is adapted to convert data between the serial data protocol and digital format.

16. An interface module according to claim 1 wherein the conversion unit is adapted such that at least one signal terminal supplies serial input data to the device, and at least one signal terminal receives serial output data from the device.

17. An interface module according to claim 16 wherein the network protocol is a serial data protocol and the conversion unit is adapted to convert data between the serial data protocol of the network and the serial data protocol of the device.

18. An interface module according to claim 17 wherein the conversion unit comprises a memory in which parameters of the serial data protocol of the device are stored.

19. An interface module according to claim 1 wherein the device connector comprises a plug or a socket for direct connection to the device.

20. An interface module according to claim 19 wherein the plug or socket is directly connected to the interface module without the use of a cable.

21. An interface module according to claim 1 wherein the conversion and configuration units are housed within a body of the device connector.

22. A controller network comprising one or more devices and a controller for control of the devices, each of the devices being connected to the controller via an interface module according to claim 1.

23. A controller network according to claim 22 further comprising at least one distribution node, each distribution node being adapted to connect a plurality of interface modules to the control network.

24. A tool comprising a controller network according to any of claim 22 wherein preferably the tool is a thin film processing tool.

25. An interface module for connecting a device to a controller within a controller network, the controller being adapted to supply and/or receive data according to a network protocol, and the device being adapted to supply and/or receive data according to a device protocol, the interface module comprising:

a network connector supporting a plurality of network channels for connecting the interface module to the controller via the controller network;

a device connector supporting a plurality of device channels for connecting the interface module to the device:

a conversion unit arranged to receive the plurality of network channels from the network connector, and adapted to convert data between the network protocol and at least two device protocols, including that of the device, the conversion unit having two or more signal terminals for supplying and/or receiving signals to or from the device; and a configuration unit between the conversion unit and the device connector, adapted to confiure the interface module to the device by routir selected device channels to selected signal terminals of the conversion unit;

wherein the configuration unit is separable from and removably coupled to the conversion unit such that the interface module may be configured for use with a different device by replacement of the configuration unit; and wherein the device comprises a sensor and the conversion unit comprises a sensing circuit adapted to generate a signal corresponding to a parameter measured by the sensor.

26. An interface module according to claim 25 wherein the sensing circuit is adapted to output the generated signal to the controller or to a local controller comprised in the device.

27. An interface module for connecting a device to a controller within a controller network, the controller being adapted to supply and/or receive data according to a network protocol, and the device being adapted to supply and/or receive data according to a device protocol, the interface module comprising:

a network connector supporting a plurality of network channels for connecting the interface module to the controller via the controller network;

a device connector supporting a plurality of device channels for connecting the interface module to the device;

a conversion unit arranged to receive the plurality of network channels from the network connector, and adapted to convert data between the network protocol and at least two device protocols, including that of the device, the conversion unit having two or more signal terminals for supplying and/or receiving signals to or from the device; and a configuration unit between the conversion unit and the device connector, adapted to configure the interface module to the device by routing selected device channels to selected signal terminals of the conversion unit;

wherein:

the configuration unit is separable from and removably coupled to the conversion unit such that the interface module may be configured for use with a different device by replacement of the configuration unit;

the plurality of network channels includes at least one power channel for supplying power to the device from at least one power source;

one or more of the signal terminals of the conversion unit are adapted to supply power to the device; and the plurality of device channels includes at least one power channel for supplying power to the device.

28. An interface module according to claim 27 wherein a plurality of power sources are provided and the plurality of network channels includes more than one power channel, each power channel having different power supply characteristics, and the conversion unit a corresponding plurality of signal terminals for supplying power to the device.

29. An interface module according to claim 27 further comprising a power supply interface section adapted to decouple the one or more power channels and regulate power supply to the conversion unit.

* * * * *